(12) United States Patent
Malinie

(10) Patent No.: US 6,371,277 B1
(45) Date of Patent: Apr. 16, 2002

(54) CONVEYOR DEVICE

(75) Inventor: Robert Malinie, Saint Michel sur Orge (FR)

(73) Assignee: Elpatronic AG, Bergdietikon (CH)

( * ) Notice: Subject to any disclaimer, the term of this patent is extended or adjusted under 35 U.S.C. 154(b) by 0 days.

(21) Appl. No.: 09/601,951

(22) PCT Filed: Feb. 3, 1999

(86) PCT No.: PCT/CH99/00046

§ 371 Date: Aug. 9, 2000

§ 102(e) Date: Aug. 9, 2000

(87) PCT Pub. No.: WO99/39849

PCT Pub. Date: Aug. 12, 1999

(30) Foreign Application Priority Data

Feb. 9, 1998 (CH) .................................................. 316/98

(51) Int. Cl.$^7$ .............................................. B65G 47/54
(52) U.S. Cl. ............................ 198/463.3; 198/468.01; 198/621.3
(58) Field of Search ............................ 198/620, 621.3, 198/622, 463.3, 468.01, 468.6

(56) References Cited

U.S. PATENT DOCUMENTS

| | | | |
|---|---|---|---|
| 3,885,680 A | * 5/1975 | Rasenberger | 214/1 BB |
| 4,030,594 A | * 6/1977 | Polin | 198/489 |
| 4,147,258 A | * 4/1979 | Kaplan | 414/680 |
| 4,273,507 A | 6/1981 | Herdzina | |
| 4,329,866 A | * 5/1982 | Babbitt | 72/405 |
| 4,711,340 A | * 12/1987 | Duri | 198/451 |
| RE32,804 E | * 12/1988 | Mason | 198/774 |
| 4,865,180 A | * 9/1989 | Brems et al. | 198/468.6 |
| 5,064,051 A | * 11/1991 | Blundy | 198/466.1 |
| 5,078,570 A | * 1/1992 | Loock | 414/751 |
| 5,449,268 A | * 9/1995 | Lingo et al. | 414/729 |
| 5,536,136 A | * 7/1996 | Mason | 414/749 |
| 5,680,787 A | * 10/1997 | Fisch | 72/405.16 |
| 5,727,669 A | * 3/1998 | Rich, Jr. | 198/468.6 |
| 5,741,343 A | * 4/1998 | Lloyd et al. | 65/260 |
| 5,842,558 A | * 12/1998 | Spatafora | 198/468.01 |
| 5,927,139 A | * 7/1999 | Kawamoto et al. | 72/405.11 |
| 6,152,286 A | * 11/2000 | Pienta | 198/459.6 |
| 6,158,566 A | * 12/2000 | Pollock | 198/347.3 |
| 6,216,847 B1 | * 4/2001 | Schmidt | 198/463.3 |
| 6,220,420 B1 | * 4/2001 | Jan et al. | 198/369.1 |
| 6,220,424 B1 | * 4/2001 | Fluck | 198/468.6 |
| 6,220,813 B1 | * 4/2001 | Launiere | 414/749.1 |
| 6,264,418 B1 | * 7/2001 | Michael et al. | 414/733 |

FOREIGN PATENT DOCUMENTS

| | | |
|---|---|---|
| DE | 1151483 | 7/1963 |
| DE | 2406619 A1 | 8/1975 |
| GB | 2051645 A | 1/1981 |
| GB | 2153281 A | 8/1985 |

\* cited by examiner

*Primary Examiner*—Christopher P. Ellis
*Assistant Examiner*—Rashmi Sharma
(74) *Attorney, Agent, or Firm*—McCormick, Paulding & Huber LLP

(57) ABSTRACT

The invention relates to a conveyor device for a modularly arranged machine line for manufacturing containers, in particular tubs. A system of clamps which brings the tubs step-by-step to each work station is operated by means of a crank drive.

19 Claims, 4 Drawing Sheets

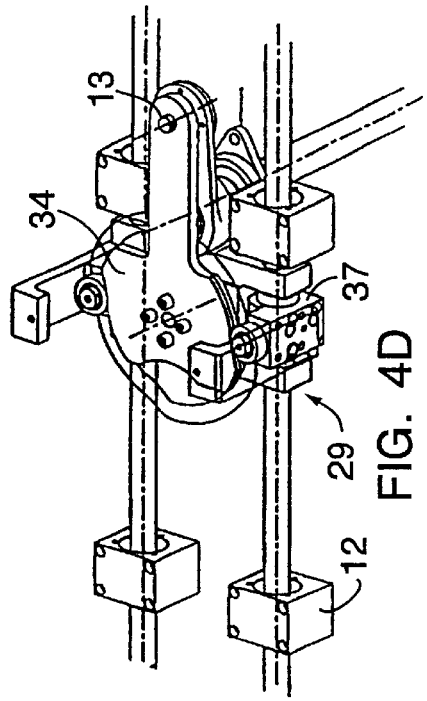
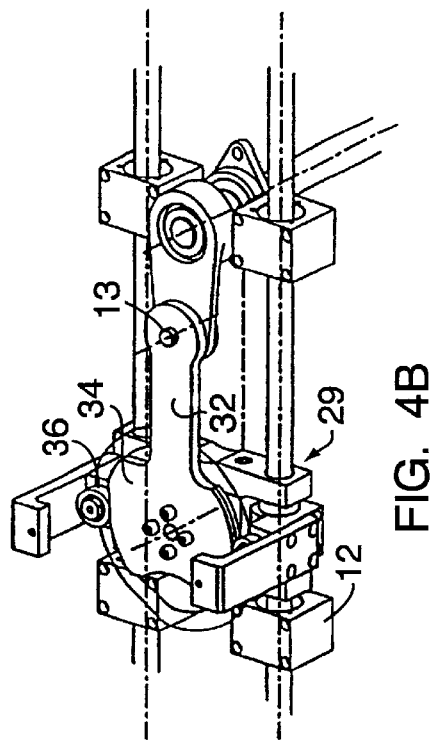
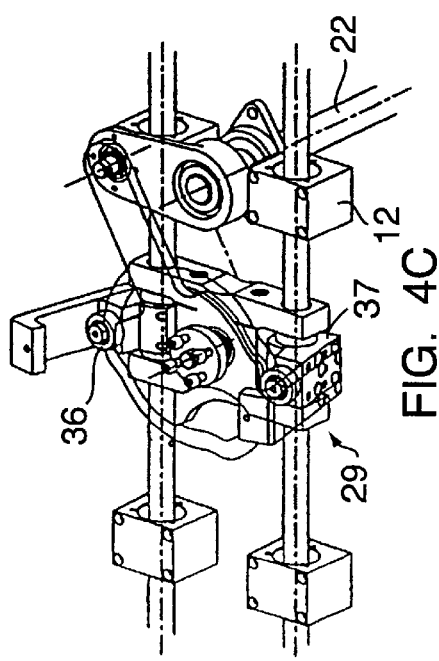
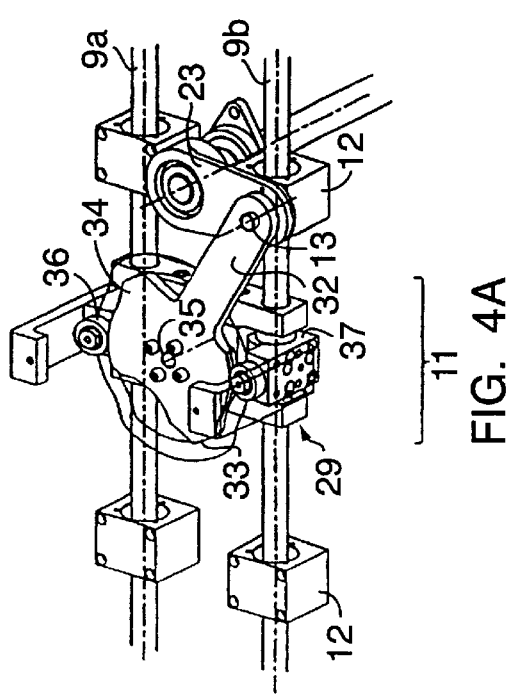

CONVEYOR DEVICE

BACKGROUND

The present invention relates to a conveyor device for a modular machine line for manufacturing containers, and especially for manufacturing tubs or drums, according to the preamble of claim 1.

Machine lines for manufacturing containers usually comprise a plurality of processing machines arranged in sequence with which the container preforms can be brought into their definitive shape. For manufacturing cylindrical or tapered containers, in particular tubs or drums, with a capacity of approx. 3 to 70 liters, welded tubular bodies are exactly positioned by means of a suitable conveyor device in a first machine, and in particular in an expansion machine, where they are formed and in particular tapered. For the next process step, the expanded bodies are picked up by means of the conveyor device and are precisely positioned in the next processing machine. In this manner the body preforms can be transferred step-by-step to the individual machines, which continue forming the preforms, applying a beaded edge, applying a curl bead, forming a flange and/or providing them with a bottom. In order to be able to do this, it is necessary to place the preforms exactly in predetermined positions of the processing machines. The processing precision largely depends on the positioning accuracy of the conveyor systems used. Conveyor systems with pairs of reciprocating bars have proved effective for manufacturing containers.

Suitable conveyor devices with pairs of reciprocating bars are known to the expert, for example from GB 2169531. The conveyor device disclosed by this publication comprises a pair of bars which are reciprocatingly moved by means of a first drive mechanism. This drive mechanism is coupled via complicated mechanical gearing to a second drive mechanism, which moves the pair of bars apart, and back towards each other. Grippers are attached at suitable points to this mechanically moved pair of bars with which the preforms to be processed are picked up and transferred in the direction of the bars to a processing machine. The movement of the grippers generated by the drive mechanism causes these to move towards each other in a first movement phase in order to pick up the preforms, displaces the grippers in a second movement phase parallel with the bars and, in a third movement phase, causes the grippers to move apart and return to their original position. Such conveyor devices not only have a complicated drive mechanism but also make access for maintenance work difficult, are not easily adaptable for processing preforms of various sizes, are very noisy in operation, and cause undesirably strong vibrations. In particular these conveyor devices are not very efficient, because the vibrations generated by the jolting movements during transfer make precise and rapid positioning of the preforms difficult.

SUMMARY OF THE INVENTION

It is therefore the aim of the present invention to provide an efficient conveyor device which does not have the drawbacks of the known devices and in particular, which is able to rapidly transfer preforms with minimal vibration and noise levels and with high positioning accuracy.

In particular the aim is to provide a conveyor device whose transfer movements and cycle can easily be adapted to differently sized container preforms, thereby optimizing conveyor performance.

The conveyor device should therefore allow an efficient utilization of the individual processing machines, i.e. should allow a simple, rapid and precise positioning of the container preforms. Furthermore, this conveyor device should be easily adjustable to the processing speed of the individual machines and to the properties of the transferred items, and should be easily accessible for maintenance work and change-overs.

According to the invention this is achieved with a conveyor device according to claim 1 and in particular by means of a pair of bars which are axially displaced and rotated by a conveyor drive unit in a synchronized and suitable manner. In a preferred embodiment the bars carry clamp sets which are aligned with each other and are fixed to the respective bars. These clamp sets are synchronously tilted out of their initial position towards each other in order to grasp the container preforms. At the same time these clamp sets begin to shift axially to their end position, i.e. into the processing position of the next following processing machine. On reaching this end position the clamp sets are tilted away from each other, thereby releasing the container preforms for processing. In a last movement stage the parted clamp sets shift back into their original starting position.

The movement cycle of these clamp sets is brought about simply by means of suitable axial and turning motions of the bars, and according to the invention is effected by a single, continuously driven conveyor drive. This conveyor drive comprises a cam drive with a cam pivotably mounted between the pair of bars and linked to a continuously operating crank drive.

In a preferred embodiment the crank drive is fixed to the machine base and comprises a drive unit with a continuously operating drive motor which drives the crank of the crank gear via a drive gear and a drive shaft. Preferably, an electric motor is used for this continuous drive. The advantages of this crank gear essentially lie in the quiet running of the continuous drive. Moreover, this drive allows the conveyor device to be simply controlled by regulating the drive speed of the motor. In this way the speed of the cycle of movements of the clamp sets, or if need be the speed of individual phases of the cycle can easily be varied and/or optimized.

The crank of this crank drive is linked with the cam gear. In this preferred embodiment the cam gear comprises a cam which can be turned about an axle by means of a lever arm. This axle is mounted on a slide which is slidably supported on the bars. The rotary motion of the crank and the link between crank and lever arm cause the cam to move to and fro parallel with the bars and at the same time to pivot in alternate directions. Parts of the rim of the cam form a track for deflection rollers. Each of these deflection rollers is mounted in a roller-block which is, in turn, fixed to one of the bars. This has the effect that a deflection of the rollers caused by movement of the cam disk results in an axial turning movement of the bars. It can be seen that the cam disk can be shaped so as to cause a synchronized rotating motion of the bars in opposite directions. In particular, the shape of the cam disk can influence this rotating motion of the bars and of the clamp sets attached thereto in such a way that the clamping motion of the clamp sets is faster than the releasing motion.

The articulated coupling of the crank and cam, and the fixing of the axle of the cam to the slide have the effect that a rotational movement of the crank causes the slide to move to and fro along the bars. As the roller-blocks which are mounted on the bars are always moved with the slide, the bars themselves are thereby moved to and fro. It will be understood that the amplitude of this reciprocating motion can easily be adjusted by changing the length of the crank and/or the length of the lever arm of the cam.

Thus the outstanding features of this device are the extreme simplicity of its construction and therefore its operational reliability. Its construction allows periodical maintenance work to be carried out without the necessity of any special technical interventions. Should malfunctions occur at one of the processing machines, the machine is freely accessible for rectification.

The device according to the invention can be easily modified and, in particular, adapted to different dimensions of the container preforms to be processed. Thus, for example, for transfer of container preforms with larger diameters it is merely necessary to utilize deflection rollers of a larger diameter.

This simple mode of construction enables the conveyor device according to the invention to be used in modularly designed machine lines, because the conveyor device does not need to be removed when replacing or converting these machine lines. It is advantageous to mount the conveyor device in the machine base.

In particular, the movement cycle of the clamp sets is easily adaptable to the properties, i.e. to the size and weight, of the container preforms to be processed. The profile of the cam disk can be designed so that the movement of the clamps meets the requirements in an optimal manner. In particular in their forward position the clamps should open smoothly and without causing any notable vibrations, and in their rear position should close as rapidly as possible. This special way of controlling the movement cycle of the clamp sets makes it possible to transfer the container preforms rapidly into an exact position at the machine while preventing them from skidding further along or even tipping over when they are released by the clamp units. Obviously, the expert will design the envelope curve of the cam disk determining the movement cycle so as to utilize the processing machines to their optimum capacity.

The suggested embodiment has a continuous drive which plays an important part in the smooth and quiet operation of the conveyor device. Vibrations are further reduced by mounting the conveyor device in the machine base.

The use of an electric motor to drive the crank mechanism makes it possible to synchronize the clamp sets with the individual processing machines in a simple manner, and to electronically control the speed of the movement cycle.

BRIEF DESCRIPTION OF THE DRAWINGS

The invention will now be described in detail with reference to an embodiment given by way of example and with the aid of the drawings, in which

FIGS. 4a to 4d are detailed drawings showing the movement cycle of the conveyor device.

DETAILED DESCRIPTION OF THE PREFERRED EMBODIMENTS

Figure 1:
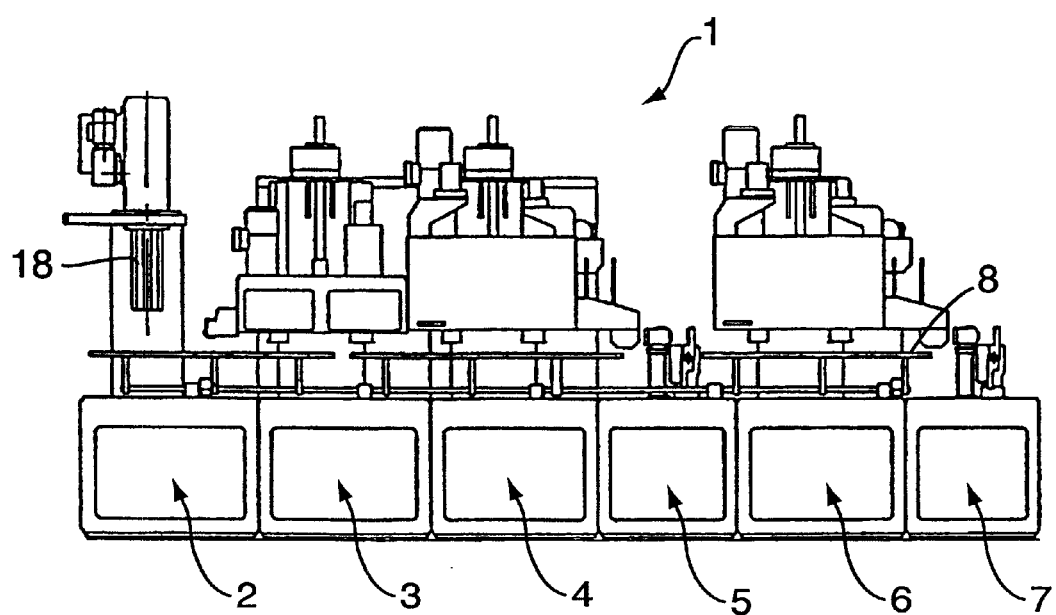
FIG. 1 is a schematic view of a machine line for manufacturing containers.

The machine line 1 shown in FIG. 1 comprises a number of modularly arranged processing machines 2 to 7 and is suitable for manufacturing tubs with a capacity of 3 to 15 liters. Similar machine lines can manufacture containers with capacities of 15 to 30 liters or 50 to 70 liters. These 3 to 15 litre containers usually have a diameter of 160 mm to 230 mm and a height of 150 mm to 300 mm. With a modern machine line it is possible to produce approx. 3600 such containers per hour. Such high production rates impose special requirements on the conveyor devices. The machine line 1 shown in FIG. 1 has a first processing module 2 for tapering cylindrical container preforms, and in particular container shell preforms. At the second machine module 3 the containers are provided with a beaded top rim and with curl beads. The next machine module 4 forms an outwardly projecting flange and a seam. Module 5 turns the container part over, i.e. stands it upside down. In the machine module 6 the turned-over container part is again provided with a flange and a beaded edge and can be clinched with a bottom part. The last machine module 7 attaches a bail to the finished tub.

Figure 2:
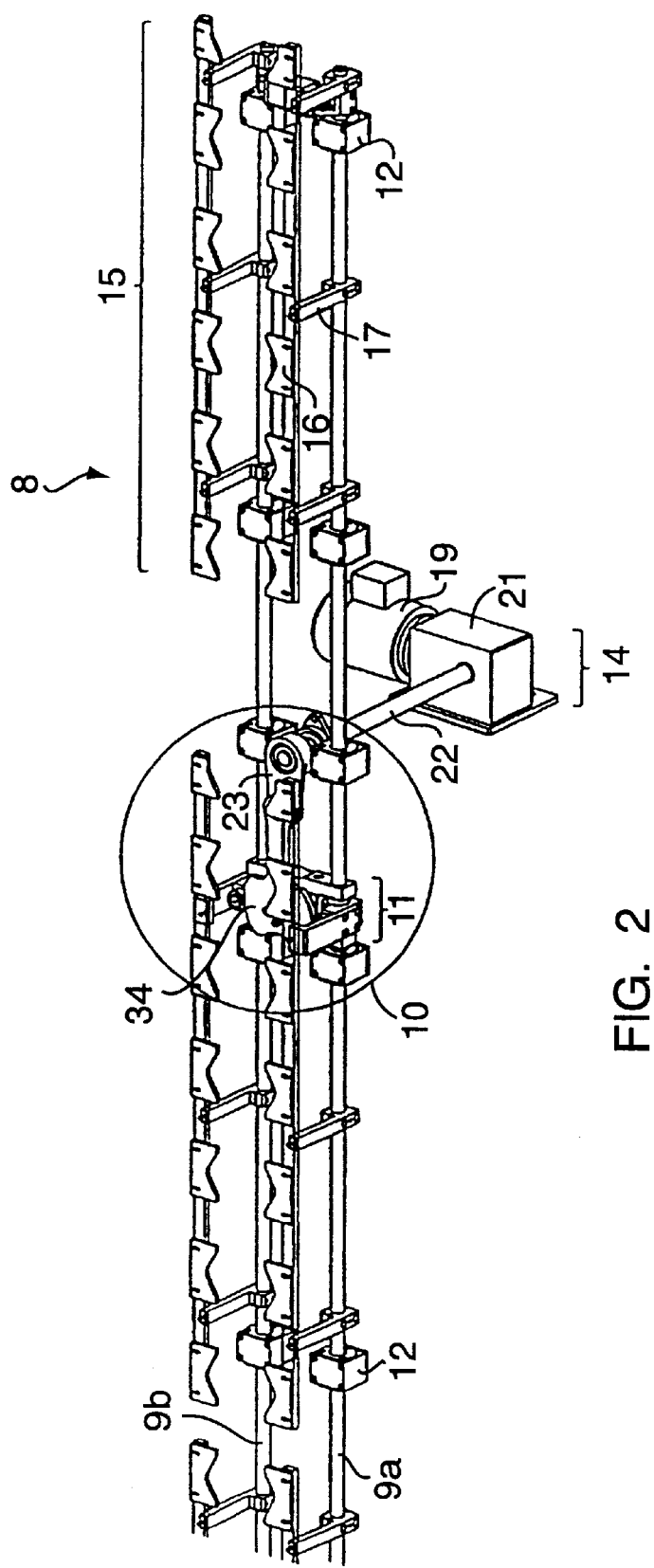
FIG. 2 is a three-dimensional view of the conveyor device according to the invention.

The conveyor device 8 shown in FIG. 2 has a pair of bars 9,9b, which are connected to a cam gear 11 and are guided in guiding elements 12 of the machine base. The cam gear 11 is connected to a crank gear 14 by a linkage 13 (not shown). Clamp sets 15 are mounted in pairs on the bars 9a,9b, which clamp sets comprise a plurality of interconnected clamps 16 and clamp carriers 17 which are fixed to the bars. These clamp sets 15 can be tilted away from each other or towards each other by rotational movements of the bars 9a,9b in opposite directions. A conveyor drive 10 controls these opposite rotational movements and, at the same time, causes an axial displacement of the bars 9a,9b. The crank gear 14 is fixed to the guiding elements 12 and comprises a motor 19, a drive gear 21, a drive shaft 22 and crank 23. The crank 23 of the crank gear 14 is linked to the cam gear 11. The cam gear 11 has a cam disk 34 which, in the present embodiment, can be rotated about its axle 35 by means of a lever arm 32. The axle 35 is mounted in a slide which is slidably carried on the bars 9a,9b. The cam 34 is moved linearly to and fro and, at the same time, turned back and forth, both motions being caused by the rotational movement of the crank 23 and the pivot connection 13 between this crank 23 and the lever arm 32. Parts of the rim 33 of the cam 34 form a track for deflection rollers 36. These deflection rollers 36 are each fitted in a roller block 37 in such a way that a deflection of the rollers 36 by the cam 34 leads to an axial rotation of the bars 9a,9b. For transfer of container preforms the clamp sets 15, which are opened in their initial position, are tilted towards each other in order to grasp the container preforms. The container preforms are transferred to the next processing module by the axial displacement of the bars 9a,9b. The clamp sets 15 are tilted away by an opposite axial rotation of the bars 9a,9b. The container preforms can then be processed by the processing machines. During this processing time the bars 9a,9b while still in their rotated position are pushed backwards into their initial position. The cam disk 34 is of course designed so that the rotational movement of the bars is synchronized and is performed in opposite directions. In particular the design of the cam disk 34 can set up this rotational movement of the bars 9a,9b and the clamp units 15 attached to these bars 9a,9b so that, for example, the closing movement of the clamp set 15 is faster than the opening movement.

Figure 3:
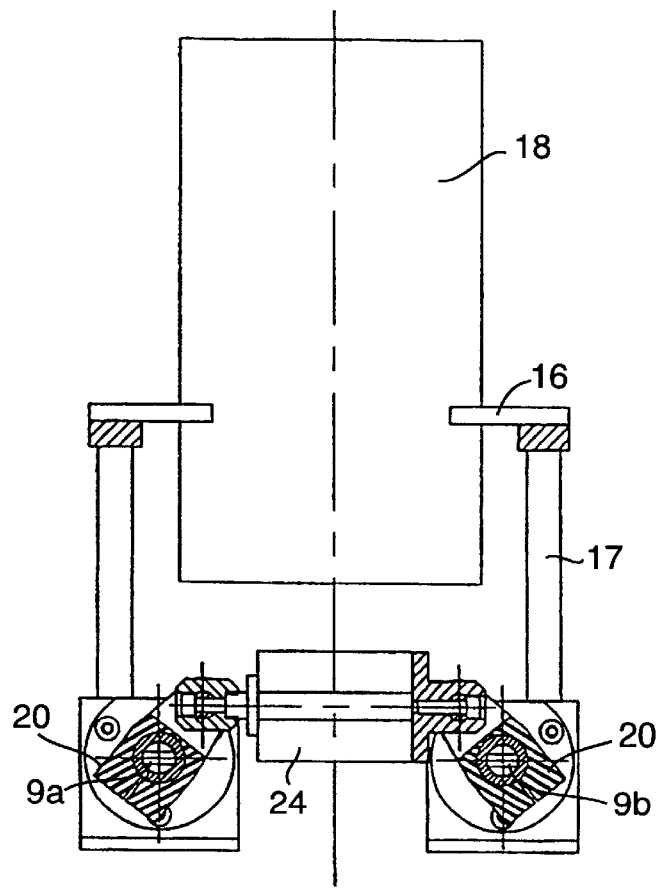
FIG. 3 is a section through the conveyor device according to the invention.

FIG. 3 shows a section through a preferred embodiment of the conveyor device according to the invention. In order to prevent the abovementioned deflection rollers 36 of the cam gear 11 from losing contact with the cam disk 34 during a rapid rotational movement of this cam disk 34, a closure unit 24 is preferably provided between the bars 9a,9b which exerts a permanent, inwardly directed torque on these. In this embodiment, a pair of clamping shoes 20 are fixed to the pair of bars 9a,9b, and are linked together by this closure unit 24. This closure unit 24 is preferably driven by a hydraulic or pneumatic pressure system. A plurality of clamp carriers 17 are fixed to these clamping shoes 20. In a preferred embodiment, each clamp carrier 17 carries e.g. five to eight clamps 16.

FIGS. 4a to 4d show the mode of operation of the conveyor drive. This drive comprises a crank gear 14, whose drive shaft 22 has a crank 23. This crank 23 is connected by a pivot 13 to a lever arm 32 of the cam 34. The axle 35 of this cam 34 is mounted in a slide 29 which is slidably carried on the bars 9a,9b. As shown in FIG. 4b, the cam 34 is for example rotated anti-clockwise about its axle 35 by the clockwise-rotating crank 23, and at the same time the axle 35 is pushed away from the drive shaft 22 in a direction parallel with the bars 9a,9b. As shown in FIG. 4c, upon further rotation of the crank 23 the cam 34 is rotated further in an anti-clockwise direction and, at the same time, the axle 35 of the cam disk 34 is drawn back again. As rotation of the crank 23 continues, the cam 34 is turned back in a clockwise direction and at the same time the axle 35 is drawn closer to the drive shaft 22. Concurrently with the movement of the cam 34 the bars 9a,9b are displaced in their longitudinal direction and also rotated about their longitudinal axis, by the action of the deflection rollers 36 and roller blocks 37.

Figure 5:
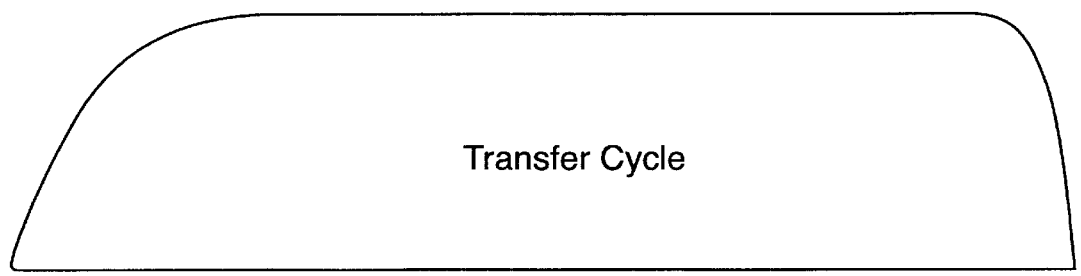
FIG. 5 is a diagram showing the speed curve of the clamp sets.

As can be seen from FIG. 5, the course of the rotational movement of the bars 9a,9b and the course of the releasing and clamping action of the clamp sets 15 fixed to these bars can be modified by giving the cam disk a suitable profile. This FIG. 5 shows a diagram of the movement of the clamps 16 from their forward position to their rearward position. In the course of this movement the clamps 16 are simultaneously opened and moved to the rearward position. From the movement curve B of these clamps 16 one can see that the releasing movement A is performed more slowly than the clamping movement C near the rearward position. In accordance with the invention the rim 33 of the cam disk 34 is designed so that the velocity of the releasing movement A is adapted to the articles to be transferred, i.e. jerks are avoided. In particular the clamps 16 are not released until after the conveyor device has stopped at the processing position. Of course, the velocity profiles of the clamping movement C and the releasing movement A may differ, i.e. in particular the velocity of the clamping movement may be higher than that of the releasing movement.

What is claimed is:

1. Conveyor device for a modularly arranged machine line with a plurality of processing machines for manufacturing containers, in particular tubs or drums, which conveyor device moves step-by-step and comprises a pair of bars which can be driven to and from by a conveyor drive, at least one set of tiltable clamps being mounted on the bars which are rotatably and displaceably mounted in guiding elements, said conveyor drive having a crank gear with a crank, said crank being linked by means of a pivot to a cam disk, rotatable about an axle, said axle being mounted in a slide moving with said pair of bars, and said cam disk having a rim parts of which are followed by deflection rollers, each of said deflection rollers being fitted in a roller block, fixed to one of the bars in such a manner that each of the bars is rotated about its longitudinal axis by a rotational movement of the cam caused by the crank gear and by consequent deflection of the rollers following the rim of the cam, and each of the bars being displaced in its longitudinal direction by a sliding movement of the cam caused by the crank gear, such displacement being brought about by the entrainment of the roller blocks which are fixed to the bars by the slide to which the axle of the cam disk is connected.

2. Conveyor device according to claim 1 wherein the cam has a lever arm.

3. Conveyor device according to claim 2 wherein the length of the lever arm is adjustable.

4. Conveyor device according to claim 1 wherein parts of the rim of the cam disk are shaped so that the clamping action of the clamp set is faster than its releasing action.

5. Conveyor device according to claim 1 wherein a closure unit (24) is provided.

6. Conveyor device according to claim 1 wherein the guiding elements form part of the machine base.

7. Conveyor device according to claim 1 wherein the crank gear has a drive motor, a drive gear, a drive shaft and a crank.

8. Conveyor device according to claim 7 wherein the drive motor is a continuously running electric motor.

9. Conveyor device according to claim 8 wherein the electric motor is synchronized with the processing machines.

10. Conveyor device according to claim 9 wherein the drive speed of the crank gear is electronically controlled.

11. Conveyor device according to claim 2 wherein parts of the rim of the cam disk are shaped so that the clamping action of the damp set is faster than its releasing action.

12. Conveyor device according to claim 3 wherein parts of the rim of the cam disk are shaped so that the clamping action of the clamp set is faster than its releasing action.

13. Conveyor device according to claim 2 wherein a closure unit is provided.

14. Conveyor device according to claim 3 wherein a closure unit is provided.

15. Conveyor device according to claim 4 wherein a closure unit is provided.

16. Conveyor device according to claim 2 wherein the guiding elements form part of the machine base.

17. Conveyor device according to claim 3 wherein the guiding elements form part of the machine base.

18. Conveyor device according to claim 4 wherein the guiding elements form part of the machine base.

19. Conveyor device according to claim 5 wherein the guiding elements form part of the machine base.

* * * * *